United States Patent
Sbarro

[11] Patent Number: 5,248,019
[45] Date of Patent: Sep. 28, 1993

[54] HUB-LESS CYCLE OR ENGINE-DRIVEN VEHICLE

[75] Inventor: Franco Sbarro, Tuileres-de-Grandson, Switzerland

[73] Assignee: SM Sbarro Mottas Engineering S.A., Switzerland

[21] Appl. No.: 884,322

[22] Filed: May 11, 1992

Related U.S. Application Data

[63] Continuation of Ser. No. 536,686, filed as PCT/CH89/00191, on Nov. 1, 1989, abandoned.

[30] Foreign Application Priority Data

Nov. 2, 1988 [FR] France .................. 88 14529

[51] Int. Cl.⁵ ............................................. B62K 21/02
[52] U.S. Cl. ......................................... 180/219; 301/1; 301/5.1
[58] Field of Search .................... 180/219, 223; 301/1, 301/5

[56] References Cited

U.S. PATENT DOCUMENTS

| | | |
|---|---|---|
| 436,844 | 9/1890 | Thorp . |
| 3,329,444 | 7/1967 | Lidov . |
| 3,884,317 | 5/1975 | Kinzel .................. 180/233 X |
| 4,045,096 | 8/1977 | Lidov . |
| 4,265,329 | 5/1981 | De Cortanze . |
| 4,526,249 | 7/1985 | Parker . |
| 4,712,638 | 12/1987 | Kawaguchi . |
| 4,723,621 | 2/1988 | Kawano et al. . |
| 4,726,603 | 2/1988 | Sugiyama et al. . |
| 4,813,511 | 3/1989 | Yamaguchi et al. . |
| 4,836,577 | 6/1989 | Abe et al. . |
| 4,917,209 | 4/1990 | Horiike et al. . |
| 5,014,807 | 5/1991 | Horiike et al. . |
| 5,014,808 | 5/1991 | Savard et al. . |
| 5,071,196 | 12/1991 | Sbarro .................. 301/1 |
| 5,121,809 | 6/1992 | Sbarro .................. 301/1 |

FOREIGN PATENT DOCUMENTS

| | | |
|---|---|---|
| 321803 | 6/1989 | European Pat. Off. . |
| 3629881 | 3/1987 | Fed. Rep. of Germany . |
| 890247 | 2/1944 | France . |
| 2533523 | 3/1984 | France . |
| 2608974 | 7/1988 | France . |
| 141383 | 5/1990 | Japan . |
| 2199794 | 7/1988 | United Kingdom . |
| 88/05743 | 8/1988 | World Int. Prop. O. . |
| 90/00477 | 1/1990 | World Int. Prop. O. . |

Primary Examiner—Mitchell J. Hill
Attorney, Agent, or Firm—Davis, Bujold & Streck

[57] ABSTRACT

The present invention relates to a cycle or an engine-driven vehicle which moves on a bearing surface and more particularly on a road. In the case of a motorcycle, the front steering wheel (20) is fitted with a first crown-shaped roller bearing (22) being comprised of an outer annular element (21) which supports the rim (19) and an interior annular element (23) which is connected to an arm (17). The arm carries at its front end a second crown-shaped roller bearing (24) of which the internal element is made integral by way of a lug (27) of the interior annular element (23) of the roller bearing (22) and of which the interior annular element (26) of bearing (24) is made integral with the arm (17). The device allows to transmit the steering forces at a point located as close as possible to the contact area between the tire (20) and the road.

5 Claims, 3 Drawing Sheets

HUB-LESS CYCLE OR ENGINE-DRIVEN VEHICLE

This is a continuation of copending application Ser. No. 07/536,686, filed as PCT/CH89/00191, on Nov. 1, 1989, now abandoned.

SUMMARY OF THE INVENTION

The present invention concerns a motorized or engine driven vehicle designed to travel on a particular surface, said vehicle comprising at least two hubless wheels, at least one of which is a drive steering wheel, each of said wheels comprising a central portion connected to a base structure of the vehicle and a peripheral portion concentric to the said central portion and disposed to rotate around the latter, the said central portion and the said peripheral portion being interconnected by at least a first ring shaped bearing, said first bearing comprising at least one interior annular element joined to the said central portion of the tire and at least one peripheral annular 15 element concentric to the said interior annular element and joined to the said peripheral portion, said latter portion having a contact means adapted to the nature of the surface with which the vehicle will be in contact, and the said central wheel portion being connected to the base structure of the vehicle at at least one off-center anchoring point on the wheel.

These vehicles offer considerable advantages over conventional vehicles which have wheels with a strong, heavy central hub on which are mounted the rim and all transmission and braking elements. Construction of wheels without a hub, such as those described in this patent application, comprising a crown shaped bearing whose exterior element supports the rim and whose interior element is joined to the suspension arms, results in considerable reduction of the size of the lever arm transmitting steering control and braking forces, permits the articulation points for vehicle suspension to be positioned quite close to the vehicle's center of gravity, and requires far fewer connections to the vehicle base. However, in these vehicles, articulation of the steering control wheel is effected in the standard fashion around a pivoting axle passing through the wheel center. In the case of a two wheeled vehicle, this embodiment imposes a more or less standard steering means acting on the suspension arm to which the exterior element of the bearing is attached.

The present invention proposes a novel construction allowing conventional connections between the handlebar and the steering wheel to be eliminated.

This goal is achieved by the vehicle according to the invention, characterized in that the said steering wheel is joined to the base structure of the vehicle by at least one second bearing disposed in a plane perpendicular to the plane of the first bearing and comprising an interior element joined to the interior annular element of the first bearing and an exterior element joined to the base structure of the vehicle.

According to a preferred embodiment, the axis of the said second bearing preferably passes through the center of the said off-center anchoring point on the steering wheel.

Advantageously, the exterior element of the said second bearing is connected with at least one suspension arm of the vehicle.

The interior portion of the said second bearing is preferably mechanically connected to a control means for the steering wheel.

BRIEF DESCRIPTION OF THE DRAWINGS

The present invention will be better understood with reference to the description of one exemplary embodiment and to the attached drawing, wherein.

DESCRIPTION OF THE PREFERRED EMBODIMENT

Figure 1:
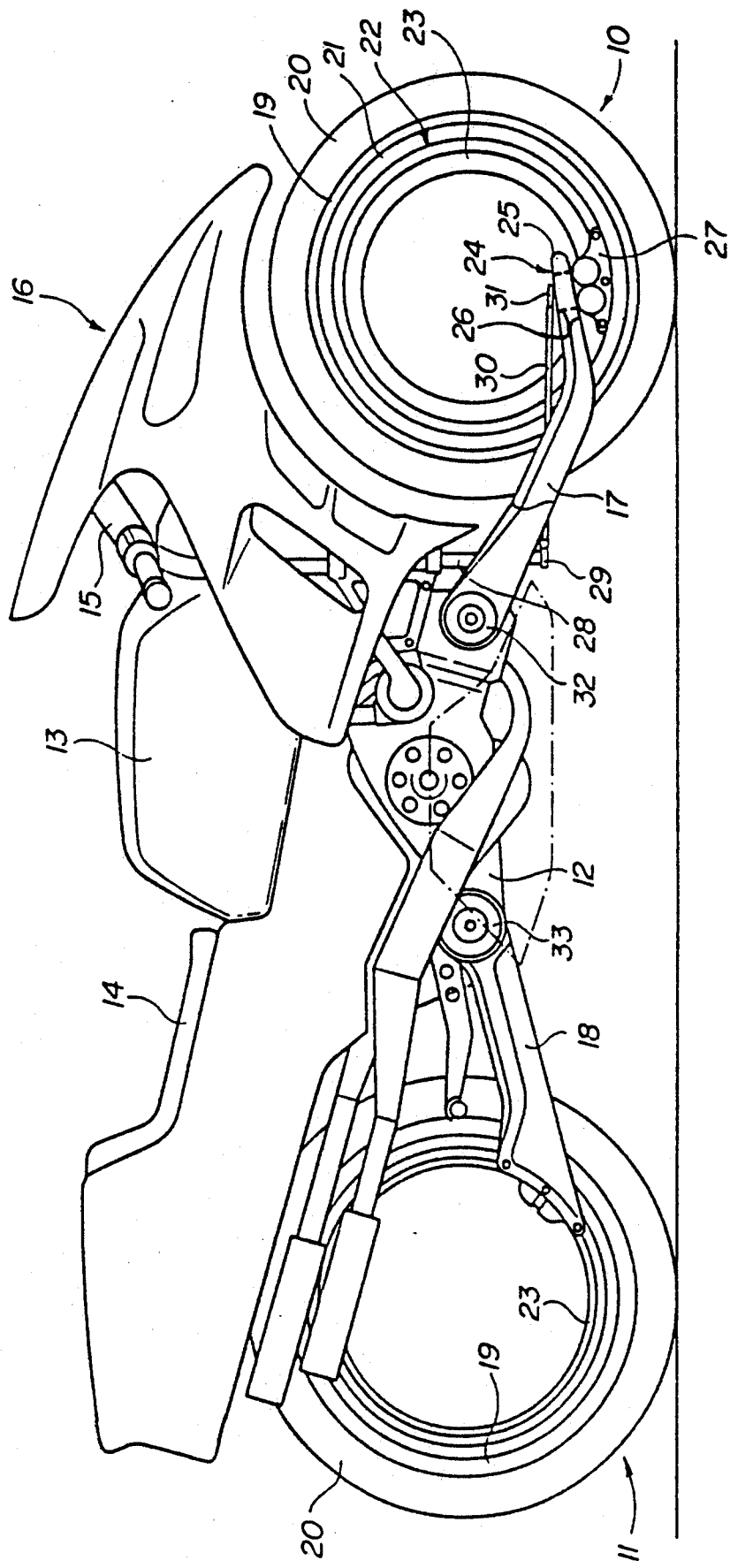
FIG. 1 is a schematic view of a motorcycle according to the invention.

The motorcycle, including a support structure, shown in FIG. 1 comprises, as is known in the art, a front wheel 10, a rear wheel 11, a motor 12, a gas tank 13 and a seat 14, these various elements being dressed or covered by a hood 16. The front wheel is connected to the motor by means of at least one arm 17 which may also be fork shaped. Rear wheel 11 is preferably held by only one arm 18, which could also be replaced by a forked arm. Each wheel comprise-s a rim 19 on which is mounted a tire 20. Rim 19 is attached to an exterior annular element 21 of a crown shaped ball bearing 22. Arms 17 and 18 are respectively attached to an interior annular element 23 of first bearings 22 corresponding to from and rear wheels 10 and 11, respectively, each having a rotational axis WRA.

At its anterior extremity, arm 17 has a second crown shaped bearing 24, exterior annular element 25 of which is rigidly attached to said extremity of arm 17, or supported by the two branches of the fork if arm 17 is replaced by a fork, and interior annular element 26 of said second bearing 24 is rigidly attached by means of bracket-like fastening means 27 to the interior annular element 23 of the first bearing 22 of front wheel 10, which is the steering wheel. Said second bearing 24 is disposed symmetrically and is perpendicular in relation to the plane P of the first bearing. Its rotational axis SRA passes through the theoretical center of the wheel.

Note that handlebar 15 is connected to interior annular element 26 of the second bearing 24 by means of a rod consisting of a generally vertical stem 28, articulated at its extremity 29 to a generally horizontal stem 30 which is connected to said annular element 26 by means of a ball and socket joint 31.

An imaginary line connecting the articulation point of handlebar 15 and the pivot point of the wheel, which actually corresponds to the center of the second bearing, would also pass through the theoretical center of the wheel.

In this embodiment, the two arms 17 and 18 are attached directly at 32 and 33, respectively, to the engine block itself or to a support therefor. Suspension may be effected by different means known in the art, particularly by means of a spring plate made of carbon fiber and standard shock absorbers attached to arms 17 and 18.

By virtue of this construction, and especially by virtue of the wheel concept, the standard heavy, cumbersome hubs are non-existent and all forces are transmitted directly to the wheels at the closest possible contact points between the tires and the road surface.

Figure 3:
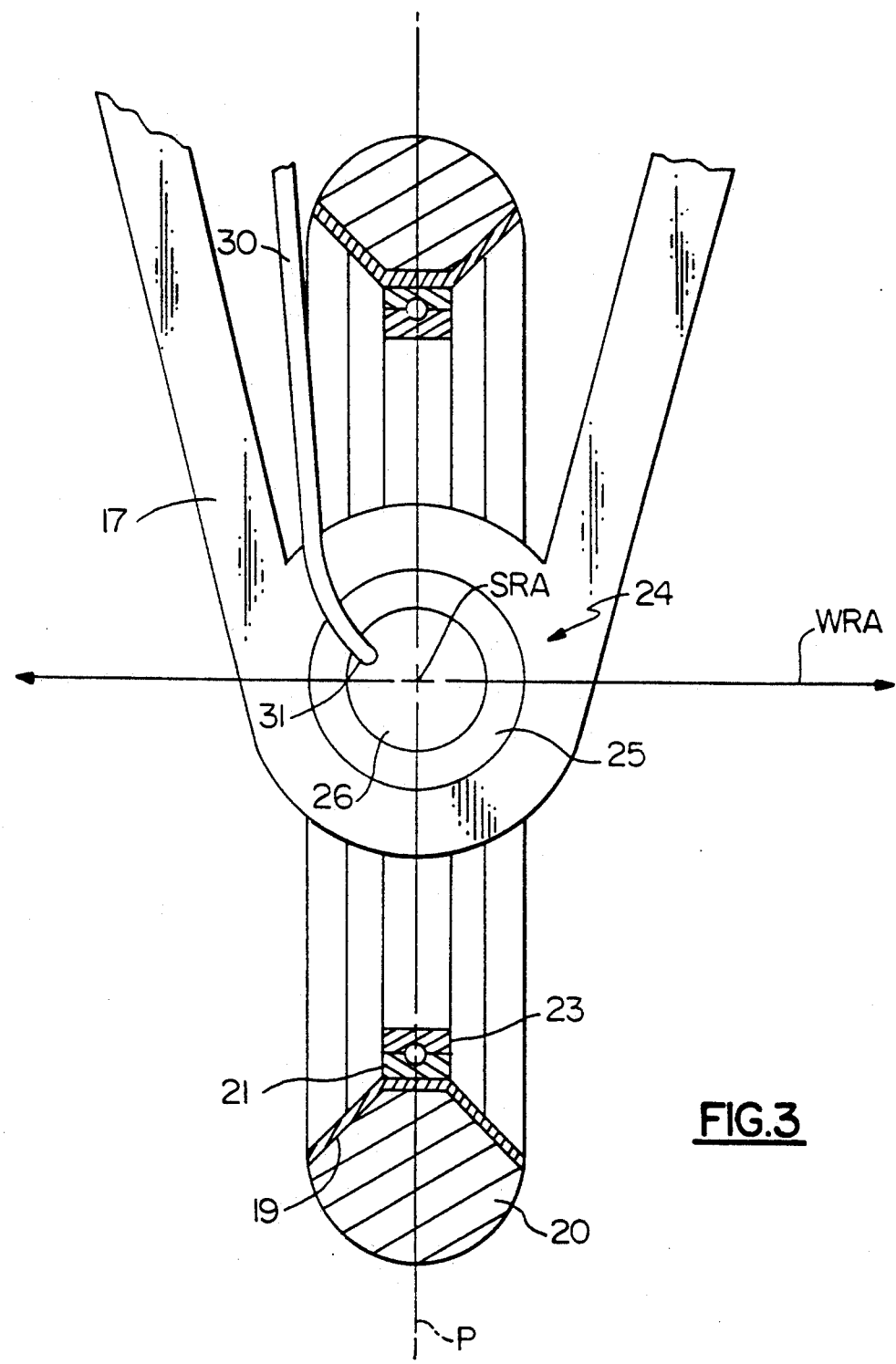
FIG. 3 shows a diagrammatic view of the exterior and interior annular elements.

FIG. 3 shows a diagrammatic representation of the above described connection of the steering wheel via the first and second bearing 22, 24.

Figure 2:
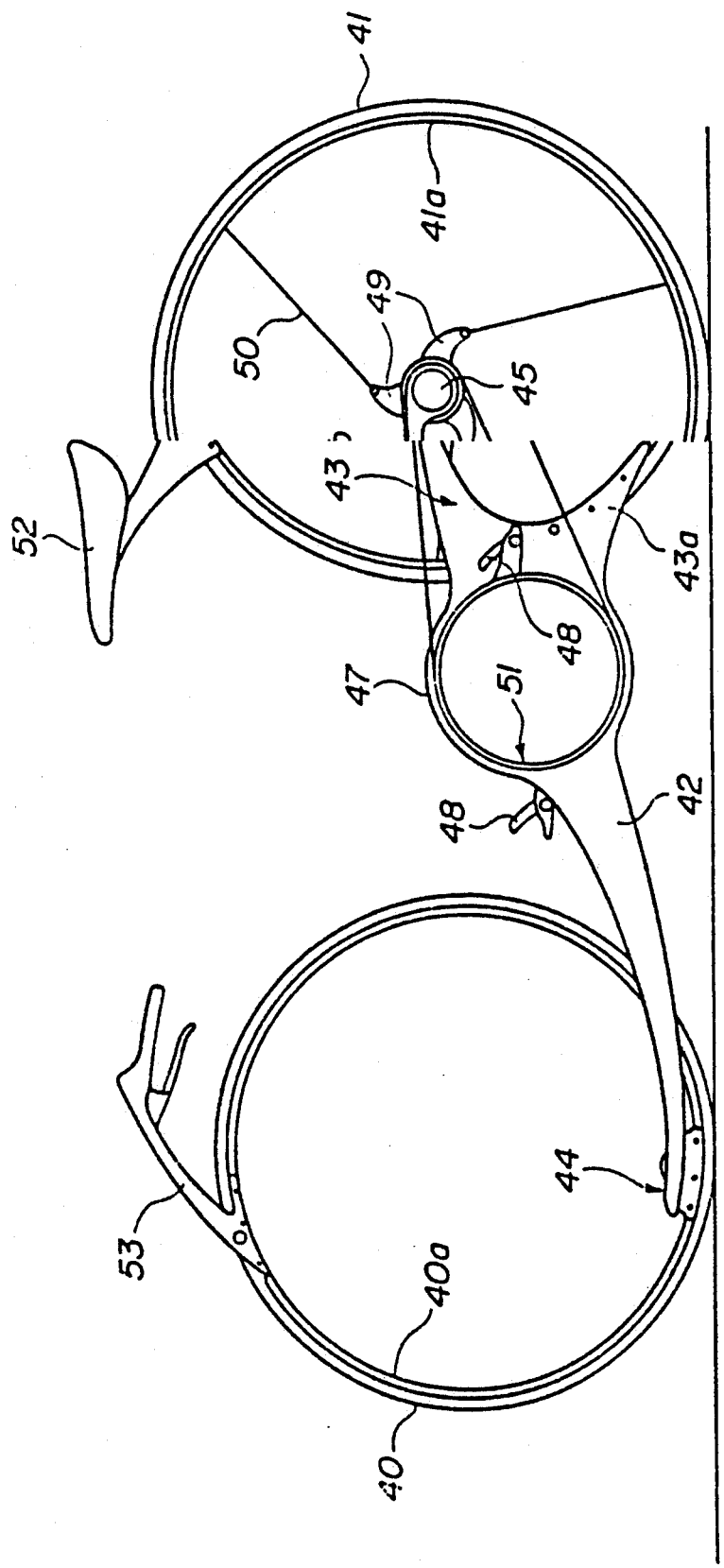
FIG. 2 shows an embodiment of a bicycle according to the invention.

FIG. 2 shows a bicycle without a frame, constructed with tires 40 and 41 each having a crown shaped bearing 40a and 41a, respectively.

The frame, virtually non-existent, has been replaced by two rigid arms 42 and 43, wherein the first arm 42 may be fork shaped. At its front extremity it is attached to a second bearing 44 along a plane generally perpendicular to the plane of the first bearing 40a, that is, to the plane of front wheel 40, and the axis of which is contained within the plane.

As before, bearing 44 comprises an interior annular element and n exterior annular element. The exterior annular element is connected to the arm or fork 42, and the interior annular element is connected to the interior annular element of bearing 40a.

With regard to rear wheel 41, bearing 41a comprises, as before, an interior annular element which is connected to arm 43.

It should be noted that arm 43 terminates in two supporting elements 43a and 43b, respectively, supporting element 43a being attached to the interior annular annular element of bearing 41a and supporting element 43b containing pinion 45 attached by a chain 46 to a gear wheel 47 connected to pedals 48. Pinion 45 may have, for example, three driving bracket connectors 49 respectively joined by three rods 50 to the exterior annular element of bearing 41a of engaged wheel 41.

It should also be noted that steering wheel 47 has no hub. It is connected to the interior annular element of one crown shaped bearing 51, the exterior annular element of which is connected to arms 42 and 43.

A seat 52 is attached to the interior annular element of bearing 41a of rear wheel 41. A handlebar 53 is attached to the interior annular element of bearing 40a of front wheel 40.

The principle described above, that is, the use of a second bearing disposed in a plane perpendicular to the plane of a steering wheel to control the steering function of said wheel, is equally applicable to four wheel vehicles. In the latter case, disposing of totally independent wheels results in simplified differential directional drive in the drive wheels, as it is known that for optimal traction during turns, the interior wheel must form a wider angle with the vehicle than the exterior wheel.

The present invention is not limited to the embodiments described and shown in the drawings, but has various other applications obvious to one skilled in the art.

I claim:

1. A driven vehicle designed to travel on a desired surface, said vehicle comprising a support structure (13, 14, 15, 16, 17, 18; 42,43) having at least two hubless wheels (10, 11; 40, 41), at least one of which is a steering wheel (10; 40), each said hubless wheel comprising an interior annular element (23) of a first bearing connected to the support structure of the vehicle and an exterior annular element (21) of said first bearing concentric to said interior annular element and disposed to rotate around the interior annular element via bearing means disposed therebetween, said first bearing having a rotational axis defining a rotation axis of the hubless wheel, said interior and exterior annular elements lying in and defining a first plane, said exterior annular element having means for engaging the surface upon which the vehicle will travel in use, and said interior annular element of the steering wheel being connected to the structure by means of a second bearing (24, 44) having a rotational axis defining a steering axis of the steering wheel, wherein said second bearing of the steering wheel comprises an interior element (26) and an exterior element (25), one of said elements of the second bearing is connected by a fastening member to said interior annular element of said first bearing and the other of said elements of the second bearing is connected by an arm to the support structure of the vehicle and said second bearing is located between the rotational axis of the wheel and the surface upon which the vehicle will travel in use.

2. A vehicle according to claim 1, wherein the steering axis of said second bearing passes through the rotational axis of the wheel 3. A vehicle according to claim 1, wherein the arm comprises at least one suspension arm and the exterior element (25) of said second bearing is connected by the at least one suspension arm (17) to the support structure of the vehicle.

4. A vehicle according to claim 1, wherein the interior element (26) of said second bearing is connected to means for controlling a steering direction of the steering wheel to steer the vehicle.

5. A vehicle according to claim 1, wherein the exterior element (25) of the second bearing is connected by the arm to the support structure of the vehicle and the interior element (26) of the second bearing is connected by the fastening member to said interior annular element of said first bearing (22).

* * * * *